United States Patent
Dong et al.

(10) Patent No.: US 8,288,030 B2
(45) Date of Patent: Oct. 16, 2012

(54) REDOX FLOW BATTERY

(75) Inventors: Yongrong Dong, Osaka (JP); Toshio Shigematsu, Osaka (JP); Takahiro Kumamoto, Osaka (JP); Michiru Kubata, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 13/148,880

(22) PCT Filed: Sep. 10, 2010

(86) PCT No.: PCT/JP2010/065646
§ 371 (c)(1),
(2), (4) Date: Aug. 10, 2011

(87) PCT Pub. No.: WO2011/111254
PCT Pub. Date: Sep. 15, 2011

(65) Prior Publication Data
US 2012/0045680 A1    Feb. 23, 2012

(30) Foreign Application Priority Data

Mar. 12, 2010 (JP) ................................. 2010-056441
Mar. 12, 2010 (JP) ................................. 2010-056442
Mar. 12, 2010 (JP) ................................. 2010-056443

(51) Int. Cl.
H01M 4/24 (2006.01)
(52) U.S. Cl. .......................... 429/101; 429/105; 429/109
(58) Field of Classification Search .................. 429/101, 429/105, 109
See application file for complete search history.

(56) References Cited

U.S. PATENT DOCUMENTS

| 4,362,791 | A | 12/1982 | Kaneko et al. |
| 2012/0115069 | A1 | 5/2012 | Noack et al. |

FOREIGN PATENT DOCUMENTS

| CA | 2220075 | | 11/1996 |
| CN | 101326672 | A | 12/2008 |

(Continued)

OTHER PUBLICATIONS

Canadian Office Action issued in Canadian Patent Application No. 2,748,146 dated Nov. 10, 2011.

(Continued)

*Primary Examiner* — Jane Rhee
(74) *Attorney, Agent, or Firm* — McDermott Will & Emery LLP

(57) ABSTRACT

A redox flow battery having a high electromotive force and capable of suppressing generation of a precipitation is provided. In a redox flow battery 100, a positive electrode electrolyte and a negative electrode electrolyte are supplied to a battery cell including a positive electrode 104, a negative electrode 105, and a membrane 101 interposed between the electrodes 104 and 105, to charge and discharge the battery. The positive electrode electrolyte contains a manganese ion, or both of a manganese ion and a titanium ion. The negative electrode electrolyte contains at least one type of metal ion selected from a titanium ion, a vanadium ion, a chromium ion, a zinc ion, and a tin ion. The redox flow battery 100 can suppress generation of a precipitation of $MnO_2$, and can be charged and discharged well by containing a titanium ion in the positive electrode electrolyte, or by being operated such that the positive electrode electrolyte has an SOC of not more than 90%. In addition, the redox flow battery 100 can have a high electromotive force equal to or higher than that of a conventional vanadium-based redox flow battery.

12 Claims, 7 Drawing Sheets

FOREIGN PATENT DOCUMENTS

| | | |
|---|---|---|
| JP | 57-009073 | 1/1982 |
| JP | 61-001270 | 1/1986 |
| JP | 02-079374 | 3/1990 |
| JP | 08-138718 | 5/1996 |
| JP | 2001-167786 | 6/2001 |
| JP | 2004-071165 | 3/2004 |
| JP | 2006-147374 | 6/2006 |
| WO | WO-2010/094657 A1 | 8/2010 |
| WO | WO 2010/094657 A1 | 8/2010 |

OTHER PUBLICATIONS

Taiwanese Office Action, with English Translation, issued in Taiwanese Patent Application No. 099132129, mailed Jan. 3, 2012.

International Search Report issued in International Application No. 10844958.8 issued on Jul. 3, 2012.

Extended European Search Report issued in European Application No. 10844958.8 issued on Jul. 3, 2012.

FIG.1
(I)
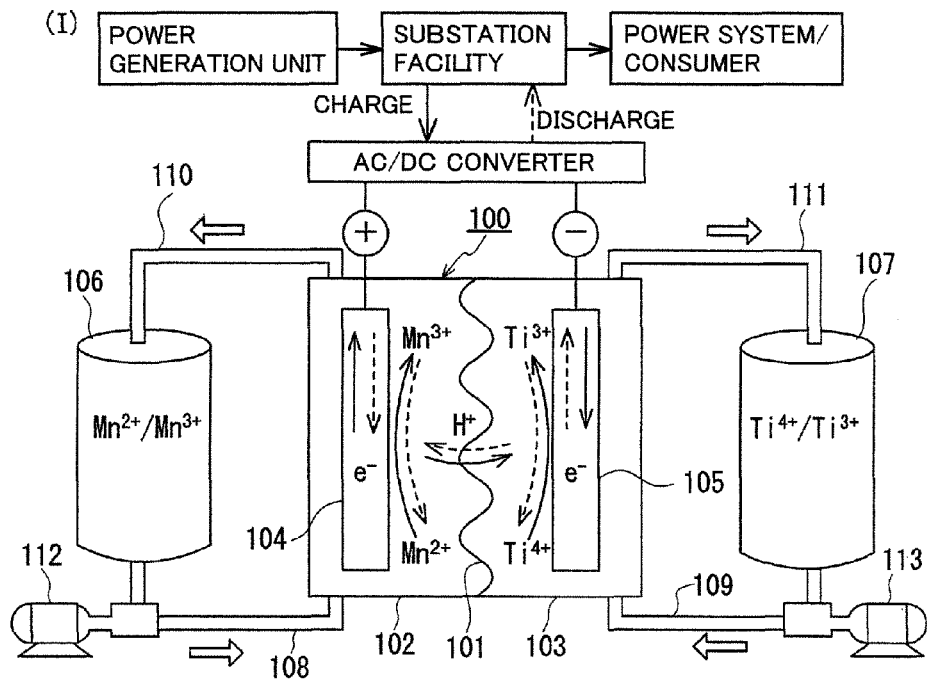
(II)
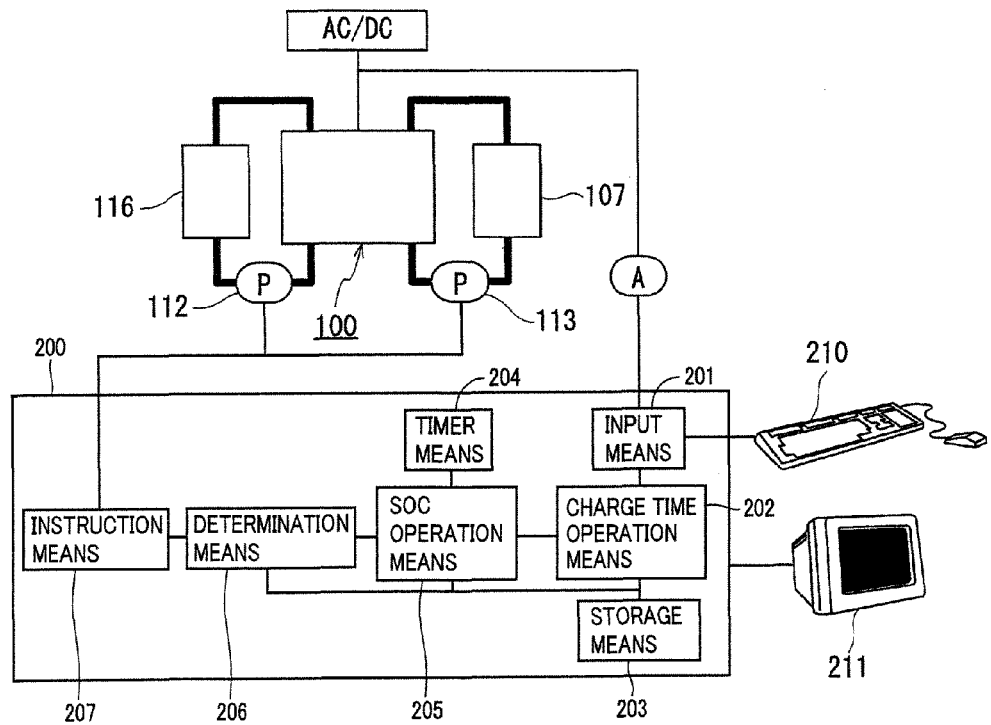

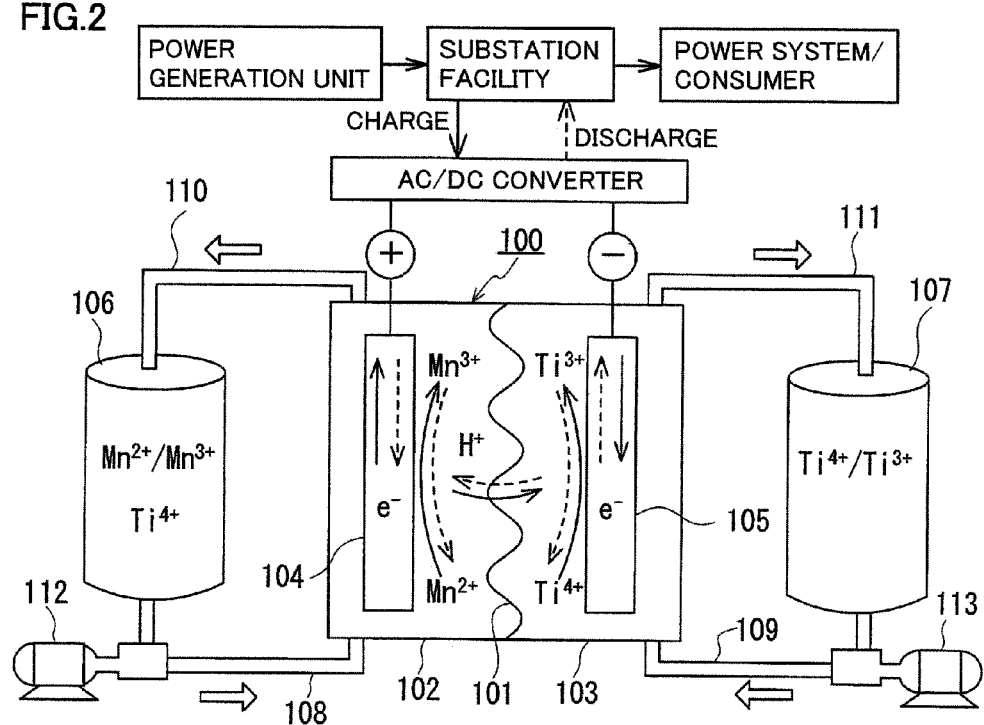
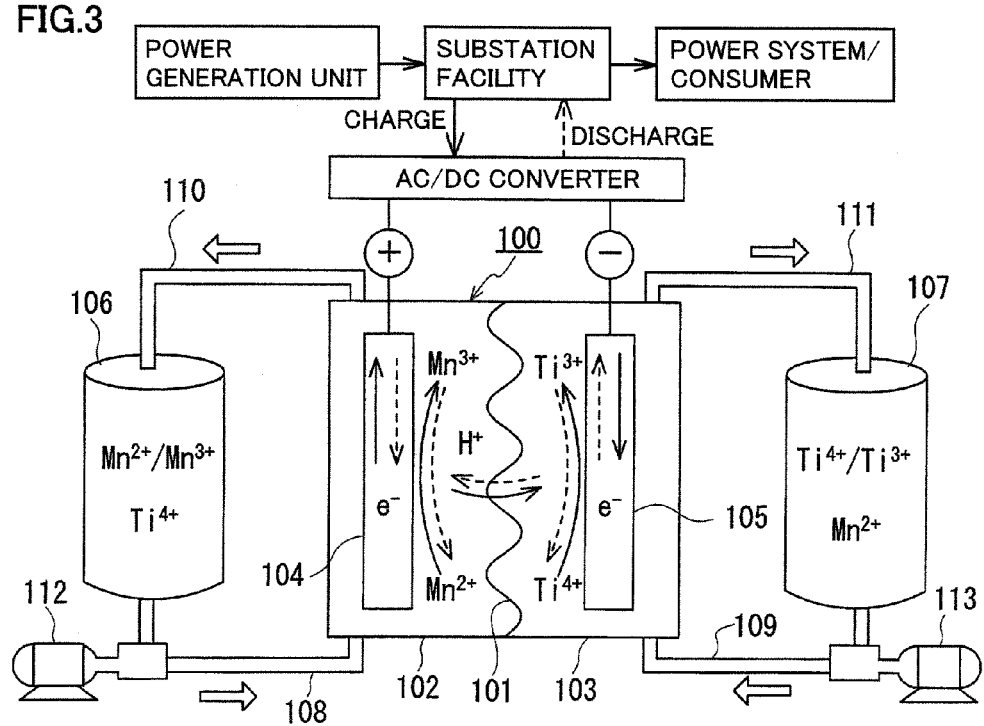

FIG.4
(I) ANION EXCHANGE MEMBRANE
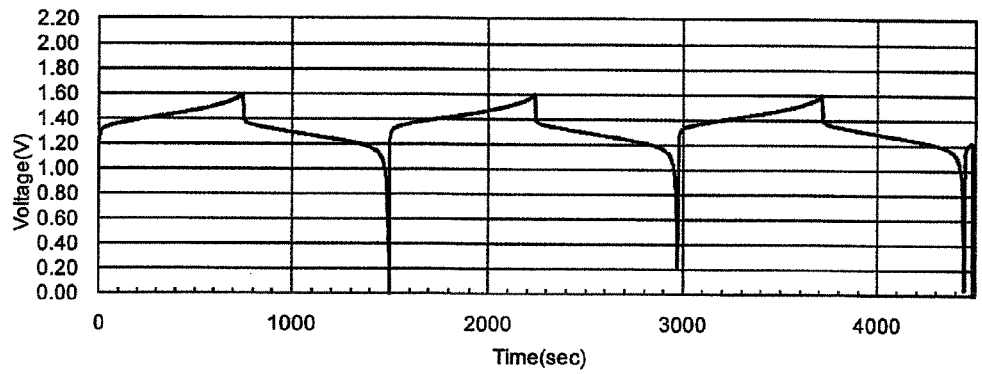
(II) CATION EXCHANGE MEMBRANE
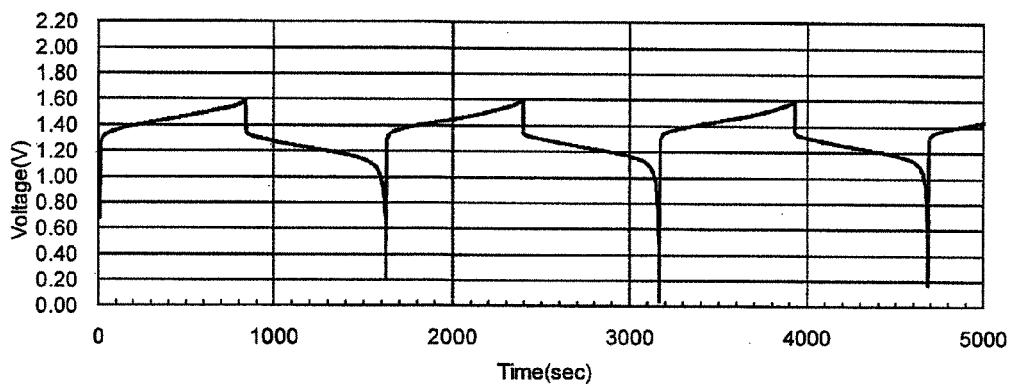
FIG.5
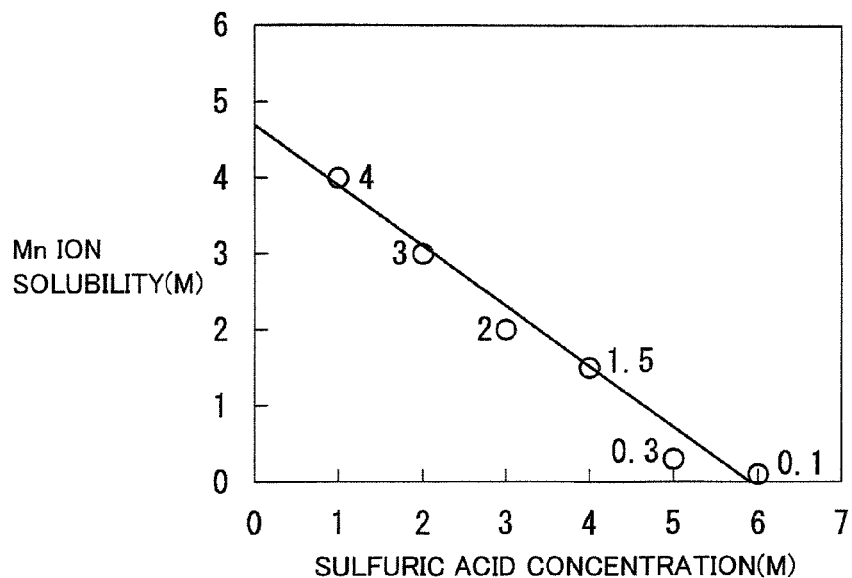

FIG.6
(I) MANGANESE ION CONCENTRATION:4M
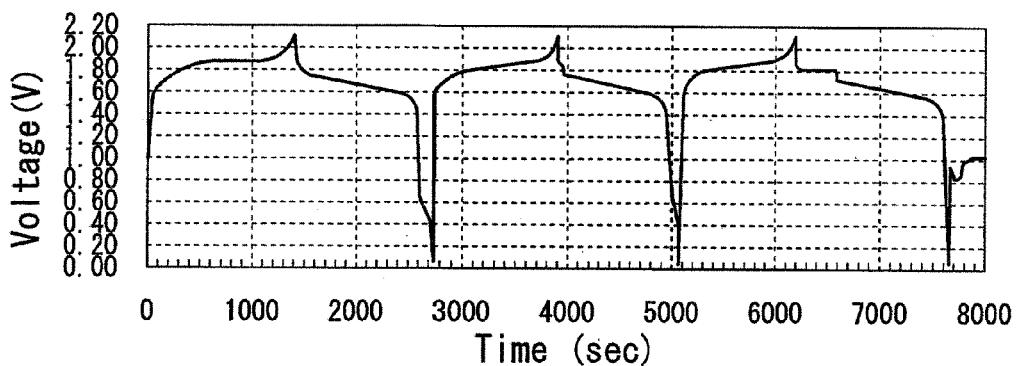
(II) MANGANESE ION CONCENTRATION:3M
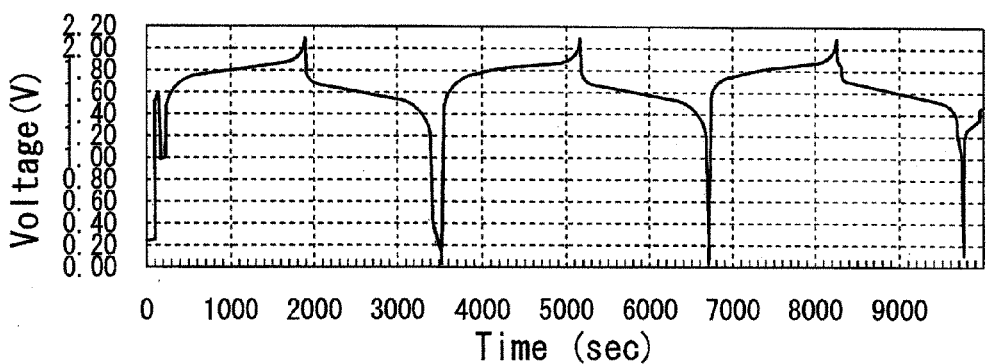
(III) MANGANESE ION CONCENTRATION:1.5M
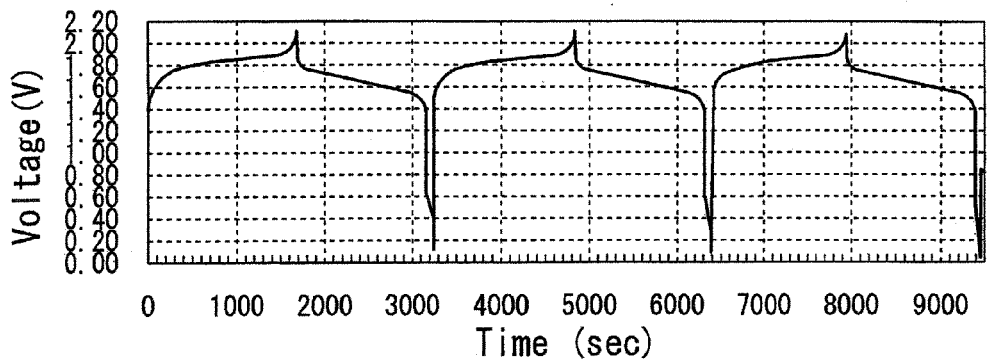

FIG.7
(I) SULFURIC ACID CONCENTRATION:2M
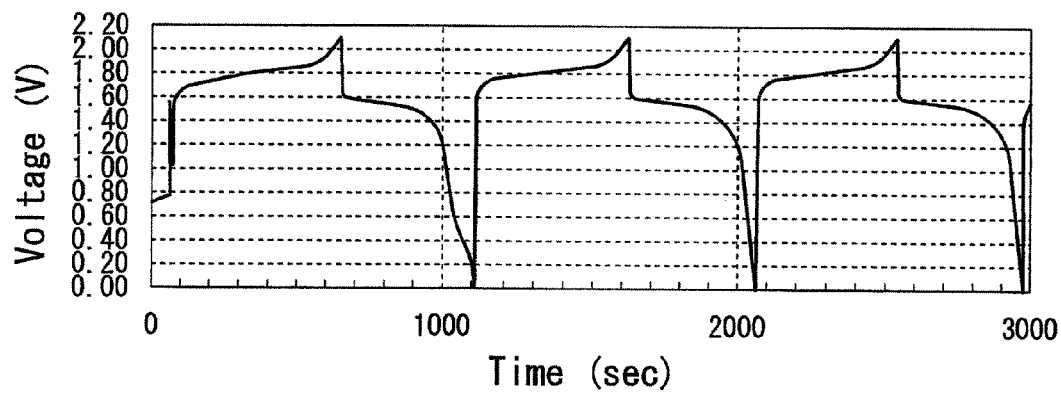
(II) SULFURIC ACID CONCENTRATION:3M
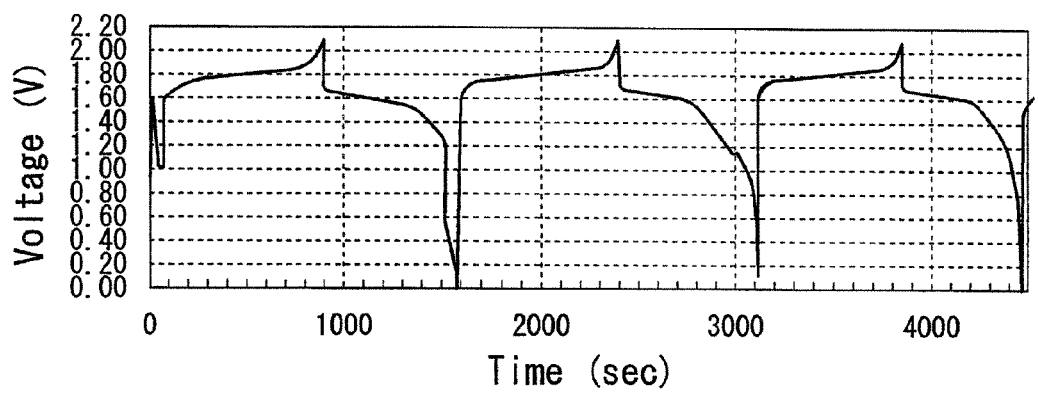
(III) SULFURIC ACID CONCENTRATION:4M
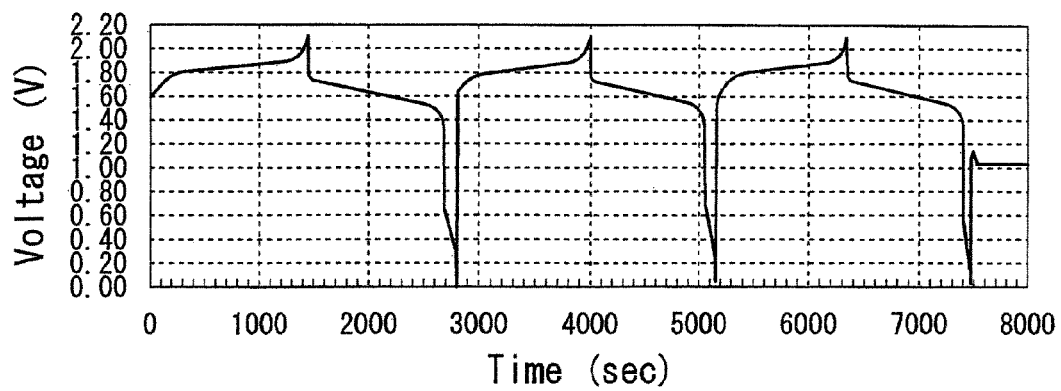

FIG.8
(I) SULFURIC ACID CONCENTRATION:1M
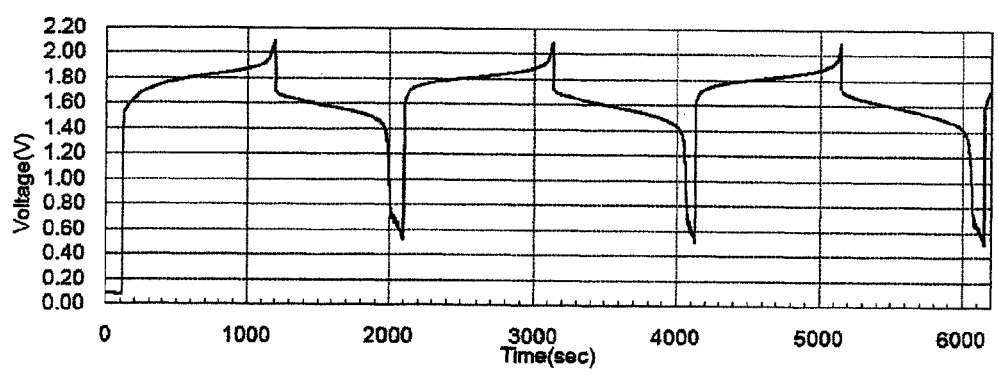
(II) SULFURIC ACID CONCENTRATION:2.5M
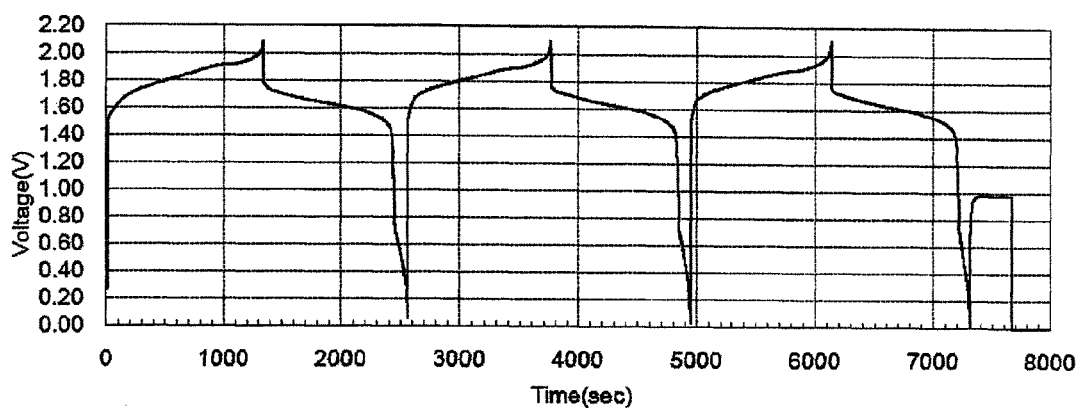

FIG.9
(I) AMOUNTS OF POSITIVE AND NEGATIVE ELECTRODE ELECTROLYTES :6ml
CURRENT DENSITY 50mA/cm$^2$
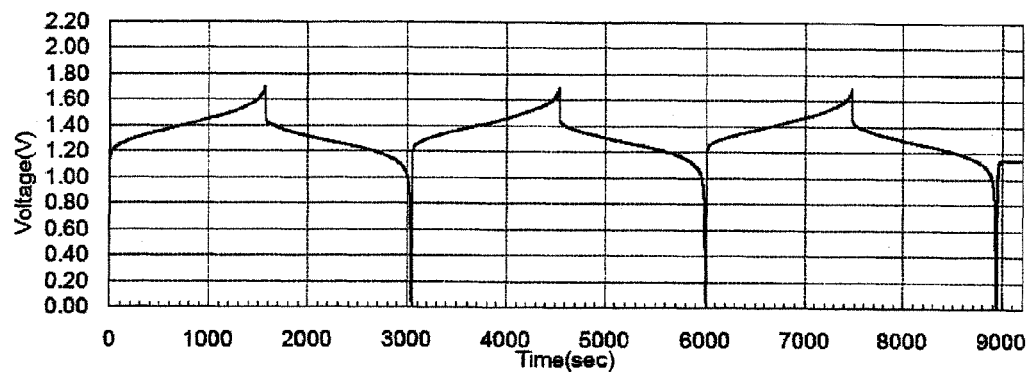
(II) AMOUNT OF POSITIVE ELECTRODE ELECTROLYTE :6ml
AMOUNT OF NEGATIVE ELECTROLYTE :9ml
CURRENT DENSITY 70mA/cm$^2$
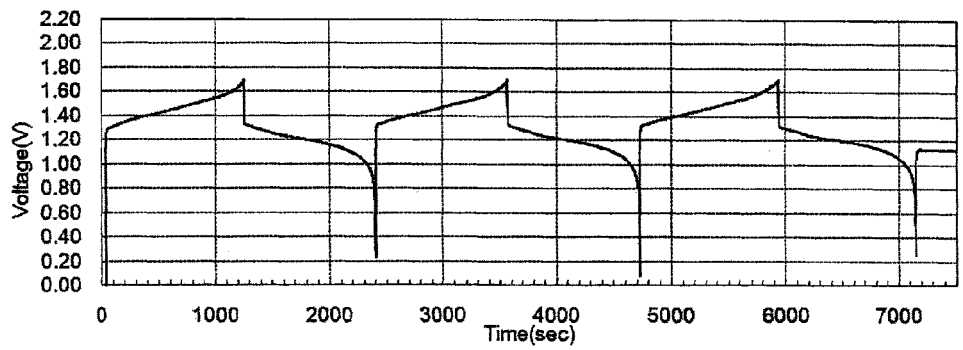
(III) AMOUNT OF POSITIVE ELECTRODE ELECTROLYTE :6ml
AMOUNT OF NEGATIVE ELECTROLYTE :9ml
CURRENT DENSITY 50mA/cm$^2$
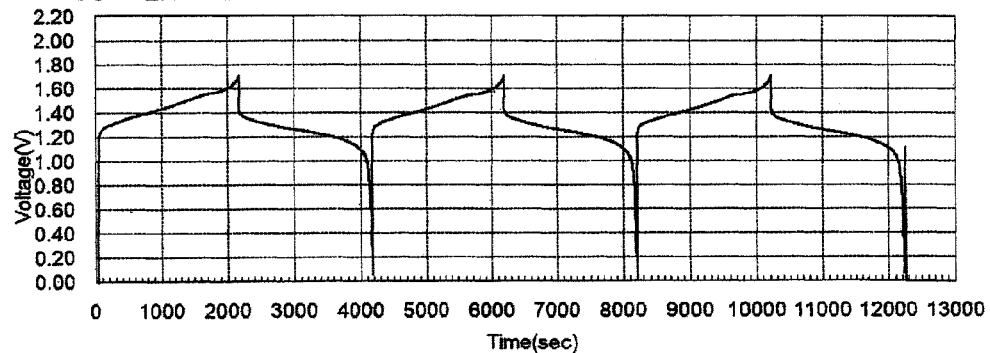

REDOX FLOW BATTERY

RELATED APPLICATIONS

This application is the U.S. National Phase under 35 U.S.C. §371 of International Application No. PCT/JP2010/065646, filed on Sep. 10, 2010, which in turn claims the benefit of Japanese Application Nos. 2010-056441, 2010-056442 and 2010-056443, filed on Mar. 12, 2010, the disclosures of which Applications are incorporated by reference herein.

TECHNICAL FIELD

The present invention relates to a redox flow battery. More particularly, the present invention relates to a redox flow battery capable of generating a high electromotive force.

BACKGROUND ART

As a way to combat global warming, introduction of new energy such as solar photovoltaic power generation and wind power generation has been promoted in recent years throughout the world. Since outputs of these power generations are affected by the weather, it is predicted that introduction on a large scale will cause problems with operation of power systems such as difficulty in maintaining frequencies and voltages. As a way to solve such problems, installation of large-capacity storage batteries for smoothing output variations, storing surplus power, and load leveling is expected.

A redox flow battery is one of large-capacity storage batteries. In a redox flow battery, a positive electrode electrolyte and a negative electrode electrolyte are supplied to a battery cell having a membrane interposed between a positive electrode and a negative electrode, to charge and discharge the battery. An aqueous solution containing a metal ion having a valence which changes by oxidation-reduction is representatively used as the electrolytes. Representative redox flow batteries include an iron-chromium-based redox flow battery using an iron ion for a positive electrode and a chromium ion for a negative electrode, and a vanadium-based redox flow battery using a vanadium ion for both electrodes (e.g., Patent Document 1).

PRIOR ART DOCUMENTS

Patent Documents
Patent Document 1: Japanese Patent Laying-Open No. 2006-147374

SUMMARY OF THE INVENTION

Problems to be Solved by the Invention

The vanadium-based redox flow battery has been commercialized, and its continued use is expected. It cannot be said, however, that the conventional iron-chromium-based redox flow battery and vanadium-based redox flow battery have a sufficiently high electromotive force. In order to meet future worldwide demand, it is desired to develop a new redox flow battery having a higher electromotive force and using a metal ion for an active material which can be supplied stably, and preferably can be supplied stably at low cost.

Therefore, an object of the present invention is to provide a redox flow battery capable of generating a high electromotive force.

Means for Solving the Problems

One possible way to increase an electromotive force is to use a metal ion having a high standard oxidation-reduction potential for an active material. Metal ions $Fe^{2+}/Fe^{3+}$ and $V^{4+}/V^{5+}$ for a positive electrode active material used in a conventional redox flow battery have standard oxidation-reduction potentials of 0.77V and 1.0V, respectively. The present inventors studied a redox flow battery using, as a metal ion for a positive electrode active material, manganese (Mn) which is a water-soluble metal ion, has a standard oxidation-reduction potential higher than those of conventional metal ions, is relatively less expensive than vanadium, and is also considered more preferable in terms of resource supply. $Mn^{2+}/Mn^{3+}$ have a standard oxidation-reduction potential of 1.51V, and a manganese ion has desirable properties for constituting a redox couple having a higher electromotive force.

When a manganese ion is used as a metal ion for a positive electrode active material, however, solid $MnO_2$ is precipitated during charge and discharge.

$Mn^{3+}$ is unstable, and produces $Mn^{2+}$ (divalent) and $MnO_2$ (tetravalent) through the following disproportionation reaction in a manganese ion aqueous solution.

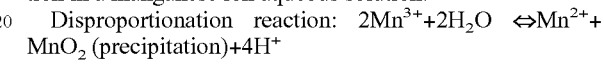
Disproportionation reaction: $2Mn^{3+}+2H_2O \Leftrightarrow Mn^{2+}+ MnO_2 \text{(precipitation)}+4H^+$ It is understood from the above expression of disproportionation reaction that precipitation of $MnO_2$ can be suppressed to some extent by reducing $H_2O$ relatively, e.g., by increasing concentration of an acid (e.g., sulfuric acid) in a solvent of an electrolyte when an acid aqueous solution such as a sulfuric acid aqueous solution is used as the solvent of an electrolyte. Here, to obtain a practical redox flow battery as a large-capacity storage battery as discussed above, it is desirable that the manganese ion have a solubility of not less than 0.3M from the viewpoint of energy density. A manganese ion, however, has the property of decreasing in solubility as acid concentration (e.g., sulfuric acid concentration) increases. Namely, if the acid concentration is increased in order to suppress precipitation of $MnO_2$, concentration of the manganese ion in the electrolyte cannot be increased, resulting in lowered energy density. In addition, depending on a type of acid, increase in acid concentration may cause increase in viscosity of an electrolyte, resulting in difficulty in use thereof.

The present inventors further studied a condition in which precipitation hardly occurs during disproportionation reaction of Mn (trivalent), reaction of $Mn^{2+}/Mn^{3+}$ takes place stably and a practical solubility is obtained even when a manganese ion is used for a positive electrode active material. As a result, it has been found that (1) containing a specific metal ion in a positive electrode electrolyte, and (2) operating a battery such that the positive electrode electrolyte has a state of charge (SOC) within a specific range can be suitably utilized as means for suppressing the precipitation.

As to (1) above, while the precise mechanism is not clear, it has been found that the precipitation can be effectively suppressed by containing a manganese ion as well as a titanium ion in the positive electrode electrolyte. In particular, they have found a surprising fact that the precipitation is not substantially observed even when charge is performed with a high SOC of the positive electrode electrolyte such as an SOC in a range of more than 90%, or even further not less than 130% when the SOC is calculated on the assumption that all of the reactions of manganese ions are one-electron reaction ($Mn^{2+}\rightarrow Mn^{3+}+e^-$). Since the precipitation can be effectively suppressed by the coexistence of manganese ion and titanium ion, the manganese ion can have a solubility of a sufficiently practical value without making the acid concentration in the solvent unnecessarily high. They have also found a novel fact that $MnO_2$ (tetravalent), which is considered to be generated during charge with the SOC of not less than 100%, is not precipitated, but can be reduced to Mn (divalent) during discharge. From these findings, the battery properties are expected to be further improved by employing the suppression means (1) above.

As to (2) above, it has been found that the precipitation can be effectively suppressed by operating the battery such that the positive electrode electrolyte had an SOC of not more than 90%. Since the precipitation can be suppressed under the specific operating condition, the manganese ion can have a solubility of a sufficiently practical value without making the acid concentration in the solvent unnecessarily high. They have also found a novel fact that under the specific operating condition, even if a small amount of $MnO_2$ was precipitated, $MnO_2$ (tetravalent) precipitated during charge and discharge can be at least partially reduced to Mn (divalent).

It has been also found that Ti/Mn-based, V/Mn-based, Cr/Mn-based, Zn/Mn-based, and Sn/Mn-based redox flow batteries using a manganese ion for a positive electrode active material, and using at least one type of metal ion selected from a titanium ion, a vanadium ion, a chromium ion, a zinc ion, and a tin ion for a negative electrode active material can have a high electromotive force, and can operate well and stably with using electrolytes in which the above metal ions were dissolved in high concentration. In particular, by using a manganese ion for a positive electrode active material, an electrolyte containing a titanium ion for a positive electrode electrolyte, a titanium ion for a negative electrode active material, and an electrolyte containing a manganese ion for a negative electrode electrolyte, i.e., by equalizing the types of metal ions in the electrolytes of both electrodes with each other, particular effects can be attained. Namely, (1) a phenomenon in which battery capacity decreases due to relative reduction in an amount of metal ions that would originally react at each electrode resulting from movement of the metal ions to a counter electrode can be effectively prevented, (2) even if liquid transfer (phenomenon in which an electrolyte of one electrode moves to the other electrode) occurs over time during charge and discharge to cause a difference in amounts of electrolytes of both electrodes, the difference can be readily corrected by mixing the electrolytes of both electrodes with each other and by other means, and (3) high manufacturability of the electrolytes is attained. The present invention is based on the above-mentioned findings.

The present invention relates to a redox flow battery in which a positive electrode electrolyte and a negative electrode electrolyte are supplied to a battery cell including a positive electrode, a negative electrode, and a membrane interposed between these electrodes, to charge and discharge the battery. The positive electrode electrolyte contains a manganese ion, and the negative electrode electrolyte contains at least one type of metal ion selected from a titanium ion, a vanadium ion, a chromium ion, a zinc ion, and a tin ion. The redox flow battery includes precipitation suppression means for suppressing precipitation of $MnO_2$. For example, the precipitation suppression means may be the followings:

(1) as the precipitation suppression means, the positive electrode electrolyte contains a titanium ion;

(2) as the precipitation suppression means, the battery is operated such that the positive electrode electrolyte has an SOC of not more than 90% when calculated on the assumption of one-electron reaction.

Further, when the positive electrode electrolyte contains a titanium ion, the following embodiment (3) may be applied:

(3) both of the positive electrode electrolyte and the negative electrode electrolyte contain both of a manganese ion and a titanium ion.

According to the above features, it is expected that a high electromotive force equal to or higher than those of conventional redox flow batteries will be obtained, and that the active materials will be stably supplied since a relatively inexpensive metal ion is used at least for the positive electrode active material. In particular, according to the above embodiment (3), it is expected that both of the positive electrode active material and the negative electrode active material will be stably supplied.

Further, according to the above embodiments (1) and (3), the coexistence of the manganese ion and the titanium ion in the positive electrode electrolyte can prevent substantial precipitation of $MnO_2$ and allow stable reaction of $Mn^{2+}/Mn^{3+}$ while using the manganese ion, thereby attaining satisfactory charge and discharge operation. Moreover, any generated $MnO_2$ is not precipitated and can be used as an active material, thus attaining a higher battery capacity. Furthermore, according to the above embodiment (3), battery capacity decrease due to movement of the metal ions to a counter electrode can be suppressed because the types of metal ions in the electrolytes of both electrodes are equal to each other, thereby ensuring a stable battery capacity over a long period of time.

According to the above embodiment (2), the specific operating condition can effectively suppress precipitation of $MnO_2$ while using the manganese ion. Thus, problems such as decrease in an amount of positive electrode active material due to precipitation of $MnO_2$ hardly occur, and reaction of $Mn^{2+}/Mn^{3+}$ can stably take place, thereby attaining satisfactory charge and discharge operation.

Further, according to the above embodiments which can suppress precipitation of $MnO_2$, the acid concentration in the solvent does not need to be excessively high, and so the solubility of the manganese ion in the positive electrode electrolyte can be increased, and the redox flow battery can have a practical manganese ion concentration. Therefore, the redox flow battery according to the present invention is expected to be suitably used for smoothing output variations, storing surplus power, and load leveling of new energy.

In addition, according to the above embodiment (3), since the types of metal ions in the electrolytes of both electrodes are equal to each other, a difference in amounts of electrolytes due to liquid transfer can be readily corrected, and high manufacturability of the electrolytes is attained.

With regard to the above embodiment (2), operation is controlled such that the positive electrode electrolyte has an SOC of not more than 90% when the SOC is calculated on the assumption that all of the reactions of manganese irons are one-electron reaction ($Mn^{2+} \rightarrow Mn^{3+}+e^-$). It has been found that the lower the SOC, the more readily the precipitation of $MnO_2$ could be suppressed, and that $MnO_2$ was not substantially precipitated when the SOC was not more than 70%, as demonstrated in experimental examples to be described later. It is therefore preferable to control operation, representatively to adjust a switching voltage depending on a liquid composition of the electrolyte, such that the SOC is not more than 70% when calculated on the assumption of one-electron reaction.

In the present invention where a manganese ion is used, it is considered that one-electron reaction mainly occurs, and so the SOC is calculated on the assumption of one-electron reaction. Nonetheless, since not only one-electron reaction but also two-electron reaction ($Mn^{2+} \rightarrow Mn^{4+}+2e^-$) may occur, the present invention allows two-electron reaction. When two-electron reaction occurs, the effect of increasing the energy density is attained.

In specific embodiments of the positive electrode electrolyte, the positive electrode electrolyte contains, when not containing a titanium ion, at least one type of manganese ion selected from a divalent manganese ion and a trivalent manganese ion, or the positive electrode electrolyte contains, when containing a titanium ion, at least one type of manganese ion selected from a divalent manganese ion and a trivalent manganese ion, and a tetravalent titanium ion. By containing one of the manganese ions, the divalent manganese ion ($Mn^{2+}$) exists during discharge and the trivalent manganese ion ($Mn^{3+}$) exists during charge, leading to existence of both manganese ions through repeated charge and discharge. The use of two manganese ions $Mn^{2+}/Mn^{3+}$ for the positive electrode active material provides a high standard oxidation-reduction potential, thus a redox flow battery having a high electromotive force can be realized. In the embodiment where the manganese ion as well as the tetravalent titanium ion exist, precipitation of $MnO_2$ can be suppressed without the specific operating condition where the SOC is within the specific range as discussed above. The tetravalent titanium ion can be contained in the electrolyte by dissolving sulfate ($Ti(SO_4)_2$, $TiOSO_4$) in the solvent for the electrolyte, for example, and representatively exists as $Ti^{4+}$. The tetravalent titanium ion may include $TiO^{2+}$ or the like. The titanium ion existing at the positive electrode mainly serves to suppress precipitation of $MnO_2$, and does not actively serve as an active material.

While the present invention suppresses precipitation of $MnO_2$ with a titanium ion, for example, as described above, tetravalent manganese may exist depending on a charged state during actual operation. Alternatively, while the present invention suppresses disproportionation reaction of Mn (trivalent) under the specific operating condition described above, disproportionation reaction may slightly occur during actual operation. When the disproportionation reaction occurs, tetravalent manganese may exist. Namely, the present invention includes embodiments where tetravalent manganese is contained, specifically:

(1) an embodiment where the positive electrode electrolyte contains at least one type of manganese ion selected from a divalent manganese ion and a trivalent manganese ion, tetravalent manganese, and a tetravalent titanium ion;

(2) an embodiment where the positive electrode electrolyte contains at least one type of manganese ion selected from a divalent manganese ion and a trivalent manganese ion, and tetravalent manganese.

The tetravalent manganese is considered to be $MnO_2$, and this $MnO_2$ is considered to be not a solid precipitation but to exist in a stable state in which the $MnO_2$ seems to be dissolved in the electrolyte. This $MnO_2$ floating in the electrolyte can be used repeatedly by being reduced to $Mn^{2+}$ (discharged) through two-electron reaction during discharge, namely, by serving as an active material, to contribute to increase in battery capacity. Accordingly, the present invention allows existence of a small amount (not more than about 10% with respect to the total amount (mol) of manganese ion) of tetravalent manganese.

On the other hand, the negative electrode electrolyte may contain a single type of metal ion selected from a titanium ion, a vanadium ion, a chromium ion, a zinc ion, and a tin ion, or may contain a plurality types of these listed metal ions. Each of these metal ions is water-soluble, and thus preferably used since an electrolyte is obtained as an aqueous solution. By using such metal ion for the negative electrode active material and the manganese ion for the positive electrode active material, a redox flow battery having a high electromotive force can be obtained.

In the embodiment where the negative electrode electrolyte contains a single type of metal ion selected from the above metal ions, a titanium-manganese-based redox flow battery containing a titanium ion as a negative electrode active material generates an electromotive force of about 1.4V. It has been surprisingly found that, even in an embodiment where the positive electrode electrolyte does not contain a titanium ion at the start of operation, if a titanium ion is contained in the negative electrode electrolyte and introduced into the positive electrode electrolyte to some extent due to liquid transfer over time during repeated charge and discharge, precipitation of $MnO_2$ can be suppressed while the precise mechanism is not clear. It has also been surprisingly found that, when a titanium ion exists in the positive electrode electrolyte, any generated $MnO_2$ is not precipitated but stably exists in the electrolyte to allow charge and discharge. Thus, since precipitation of $MnO_2$ can be suppressed and $Mn^{3+}$ can be stabilized to allow sufficient charge and discharge, it is preferable to use a titanium ion for the negative electrode active material.

Particularly, in an embodiment where the positive electrode electrolyte contains a manganese ion as well as a titanium ion serving as the active materials and the negative electrode electrolyte contains a titanium ion serving as the active material from the start of operation, the types of metal ions existing in the electrolytes of both electrodes overlap, and so disadvantages due to liquid transfer hardly occur. On the other hand, in an embodiment where the positive electrode electrolyte does not contain a titanium ion and a titanium ion is used for the negative electrode active material from the start of operation, it is preferable to actively suppress precipitation of $MnO_2$ under the specific operating condition as discussed above, since liquid transfer is not essentially a preferable phenomenon.

In the embodiments where the negative electrode electrolyte contains a single type of metal ion selected from the above metal ions, a vanadium-manganese-based redox flow battery containing a vanadium ion can have an electromotive force of about 1.8V, a chromium-manganese-based redox flow battery containing a chromium ion can have an electromotive force of about 1.9V, and a zinc-manganese-based redox flow battery containing a zinc ion can have a higher electromotive force of about 2.2V. A tin-manganese-based redox flow battery containing a tin ion can have an electromotive force of about 1.4V, which is similar to an electromotive force of a titanium-manganese-based redox flow battery.

The embodiments where the negative electrode electrolyte contains a single type of metal ion selected from the above metal ions includes embodiments where the negative electrode electrolyte satisfies any one of the following (1) to (5):

(1) containing at least one type of titanium ion selected from a trivalent titanium ion and a tetravalent titanium ion;

(2) containing at least one type of vanadium ion selected from a divalent vanadium ion and a trivalent vanadium ion;

(3) containing at least one type of chromium ion selected from a divalent chromium ion and a trivalent chromium ion;

(4) containing a divalent zinc ion; and (5) containing at least one type of tin ion selected from a divalent tin ion and a tetravalent tin ion.

When the above (1) is satisfied, by containing one of the titanium ions, a tetravalent titanium ion (such as $Ti^{4+}$, $TiO^{2+}$) exists during discharge and a trivalent titanium ion ($Ti^{3+}$) exists during charge, leading to existence of both titanium ions through repeated charge and discharge. A divalent titanium ion may also exist. In this embodiment, therefore, the negative electrode electrolyte may contain at least one type of titanium ion selected from a divalent titanium ion, a trivalent titanium ion, and a tetravalent titanium ion.

When the above (2) is satisfied, by containing one of the vanadium ions, a trivalent vanadium ion ($V^{3+}$) exists during discharge and a divalent vanadium ion ($V^{2+}$) exists during charge, leading to existence of both vanadium ions through repeated charge and discharge. When the above (3) is satisfied, by containing one of the chromium ions, a trivalent chromium ion ($Cr^{3+}$) exists during discharge and a divalent chromium ion ($Cr^{2+}$) exists during charge, leading to existence of both chromium ions through repeated charge and discharge. When the above (4) is satisfied, by containing the divalent zinc ion, a divalent zinc ion ($Zn^{2+}$) exists during discharge and metal zinc (Zn) exists during charge, leading to existence of the divalent zinc ion through repeated charge and discharge. When the above (5) is satisfied, by containing one of the tin ions, a tetravalent tin ion ($Sn^{4+}$) exists during discharge and a divalent tin ion ($Sn^{2+}$) exists during charge, leading to existence of both tin ions through repeated charge and discharge.

When the negative electrode electrolyte contains a plurality types of the metal ions, it is preferable to combine the metal ions in consideration of a standard oxidation-reduction potential of each metal, such that each metal ion is successively involved in battery reaction with increase in voltage during charge. In accordance with the order of nobleness of potential, $Ti^{3+}/Ti^{4+}$, $V^{2+}/V^{3+}$, and $Cr^{2+}/Cr^{3+}$ are combined and contained in a preferred embodiment. In addition, the negative electrode can also contain a manganese ion, and the negative electrode electrolyte can contain a titanium ion and a manganese ion, or a chromium ion and a manganese ion, for example. The manganese ion contained in the negative electrode electrolyte is not to function as an active material, but to mainly cause overlap of the types of metal ions in the electrolytes of both electrodes. More specifically, when the negative electrode active material contains a titanium ion, and contains a manganese ion to overlap or be equal to a type of metal ion in the positive electrode electrolyte, for example, the negative electrode electrolyte may contain at least one type of titanium ion selected from a trivalent titanium ion and a tetravalent titanium ion, and a divalent manganese ion, or may contain at least one type of titanium ion selected from a divalent titanium ion, a trivalent titanium ion, and a tetravalent titanium ion, and a divalent manganese ion. The positive electrode electrolyte may also contain, in addition to the manganese ion serving as the positive electrode active material, a metal ion which does not substantially function as an active material such as the aforementioned titanium ion. For example, the negative electrode electrolyte may contain a chromium ion and a manganese ion (representatively a divalent manganese ion), and the positive electrode electrolyte may contain, in addition to the aforementioned manganese ion and titanium ion, a chromium ion (representatively a trivalent chromium ion). When the types of metal ions in the electrolytes of both electrodes overlap or become equal to each other in this manner, the following effects can be attained. Namely, (1) a phenomenon in which battery capacity decreases due to reduction in an amount of metal ions that would originally react as an active material at each electrode resulting from movement of the metal ions at each electrode to a counter electrode due to liquid transfer can be suppressed, (2) even if the amounts of electrolytes become unbalanced due to liquid transfer, the unbalanced amounts can be readily corrected, and (3) high manufacturability of the electrolytes is attained.

It is preferable that all of the metal ions contained in the electrolytes of both electrodes for serving as the active materials have a concentration of not less than 0.3M and not more than 5M ("M": molarity). Thus, the present invention includes an embodiment where the manganese ion in the positive electrode electrolyte and the metal ions in the negative electrode electrolyte all have a concentration of not less than 0.3M and not more than 5M. In addition, it is preferable that the metal ions contained in the electrolytes of both electrodes mainly to cause overlap of the types of metal ions also have a concentration of not less than 0.3M and not more than 5M. For example, when the positive electrode electrolyte contains a titanium ion, both of the manganese ion and the titanium ion in the positive electrode electrolyte may have a concentration of not less than 0.3M and not more than 5M. For example, when both of the positive and negative electrode electrolytes contain both a manganese ion and a titanium ion, both of the manganese ion and the titanium ion may have a concentration of not less than 0.3M and not more than 5M.

If the metal ions serving as the active materials of both electrodes have a concentration of less than 0.3M, it is difficult to ensure sufficient energy density (e.g., about 10 kWh/$m^3$) as a large-capacity storage battery. In order to increase energy density, it is preferable for the metal ions to have a high concentration, and more preferably a concentration of not less than 0.5M, and further not less than 1.0M. In an embodiment where the positive electrode electrolyte contains a titanium ion, even if the manganese ion in the positive electrode electrolyte has a very high concentration of not less than 0.5M, or not less than 1.0M, Mn (trivalent) is stable and precipitation can be suppressed, thereby attaining satisfactory charge and discharge. If an acid aqueous solution is used as the solvent for the electrolyte, however, increase in acid concentration to some text can suppress precipitation of $MnO_2$ as discussed above, but results in lower solubility of the metal ions due to the increase in acid concentration. Thus, a maximum concentration of the metal ions is considered to be 5M. In an embodiment where a titanium ion exists in the positive electrode electrolyte, the titanium ion which does not actively function as the positive electrode active material can sufficiently suppress precipitation of $MnO_2$ when having a concentration of 0.3M to 5M, and thus acid concentration can be increased to some extent when an acid aqueous solution is used as the solvent of the positive electrode electrolyte as described above. In particular, by equalizing the types and concentrations of the metal ions of the positive and negative electrodes with each other, battery capacity decrease due to movement of the metal ions to a counter electrode and liquid transfer can be readily corrected. In an embodiment where the same types of metal ions exist in the electrolytes of the positive and negative electrodes, it is preferable that metal ions in one electrode have the same concentration (e.g., titanium ion concentration and manganese ion concentration) from the viewpoint of equalizing the concentrations of the metal ions of the positive and negative electrode with each other, and equalizing the amounts of electrolytes of the positive and negative electrodes with each other.

The present invention includes an embodiment where each solvent for the electrolytes of both electrodes is at least one type of aqueous solution selected from $H_2SO_4$, $K_2SO_4$, $Na_2SO_4$, $H_3PO_4$, $H_4P_2O_7$, $K_2PO_4$, $Na_3PO_4$, $K_3PO_4$, $HNO_3$, $KNO_3$, and $NaNO_3$.

All of the metal ions mentioned above, namely, the metal ions serving as the active materials of both electrodes, the metal ions for suppressing precipitation, and the metal ions not actively functioning as the active materials are water-soluble ions, and so an aqueous solution can be suitably used as the solvents for the electrolytes of both electrodes. In particular, when the aqueous solution contains at least one type of sulfuric acid, phosphoric acid, nitric acid, sulfate, phosphate, and nitrate as mentioned above, a plurality of effects are expected to be attained. Namely, (1) improved stability, reactivity and solubility of the metal ions may be obtained, (2) side reaction hardly occurs (decomposition hardly occurs) even when a metal ion having a high potential such as Mn is used, (3) ion conductivity is increased and internal resistance of the battery is reduced, and (4) unlike when hydrochloric acid (HCl) is used, chlorine gas is not generated. The electrolyte in this embodiment contains at least one type of sulfate anion ($SO_4^{2-}$), phosphate anion (representatively $PO_4^{3-}$), and nitrate anion ($NO_3^-$). If the concentration of the acid in the electrolyte is too high, however, the solubility of the manganese ion may decrease and the viscosity of the electrolyte may increase. It is thus considered preferable that the acid have a concentration of less than 5M.

The present invention includes an embodiment where both of the electrolytes contain sulfate anion ($SO_4^{2-}$). Here, it is preferable that both of the electrolytes have a sulfuric acid concentration of less than 5M.

The embodiment where both of the electrolytes contain sulfate anion ($SO_4^{2-}$) is preferable compared to the cases where the electrolytes contain phosphate anion or nitrate anion as described above, because the stability and reactivity of the metal ions serving as the active materials of both electrodes, the stability of the metal ions for suppressing precipitation, and the stability of the metal ions not actively functioning as the active materials, which are contained for the purpose of equalizing the types of metal irons of both electrodes with each other, are improved. For both of the electrolytes to contain sulfate anion, a sulfate salt containing the above metal ions may be used, for example. Further, by using a sulfuric acid aqueous solution as a solvent for the electrolyte in addition to the use of sulfate, the stability and reactivity of the metal ions can be improved, side reaction can be suppressed, and the internal resistance can be reduced, as discussed above. If the sulfuric acid concentration is too high, however, the solubility decreases as discussed above. It is thus preferable that the sulfate concentration be less than 5M, and 1M to 4M for easy use.

The present invention includes an embodiment where the positive electrode and the negative electrode are made of at least one type of material selected from the following (1) to (10):

(1) a composite material including at least one type of metal selected from Ru, Ti, Ir, Mn, Pd, Au, and Pt, and an oxide of at least one type of metal selected from Ru, Ti, Ir, Mn, Pd, Au, and Pt (e.g., a Ti substrate with an Ir oxide or a Ru oxide applied thereon); (2) a carbon composite including the above composite material; (3) a dimensionally stable electrode (DSE) including the above composite material; (4) a conductive polymer (e.g., a polymer material that conducts electricity such as polyacetylene, polythiophene); (5) graphite; (6) glassy carbon; (7) conductive diamond; (8) conductive diamond-like carbon (DLC); (9) a nonwoven fabric made of carbon fiber; and (10) a woven fabric made of carbon fiber.

Here, when the electrolyte is an aqueous solution, since $Mn^{2+}/Mn^{3+}$ have a standard oxidation-reduction potential nobler than an oxygen generation potential (about 1.0V), oxygen gas may be generated during charge. In contrast, oxygen gas is hardly generated when an electrode formed of a nonwoven fabric made of carbon fiber (carbon felt) is used, for example, and oxygen gas is not substantially generated with some of electrodes made of conductive diamond. By selecting an electrode material as appropriate in this manner, generation of oxygen gas can also be effectively reduced or suppressed. In addition, the electrode formed of a nonwoven fabric made of carbon fiber has advantages of (1) having a large surface area, and (2) having excellent circulation of the electrolyte.

The present invention includes an embodiment where the membrane is at least one type of membrane selected from a porous membrane, a swellable membrane, a cation exchange membrane, and an anion exchange membrane. The swellable membrane refers to a membrane composed of a polymer (e.g., cellophane) which does not have a functional group and contains water. The ion exchange membranes have advantages of (1) attaining excellent isolation of the metal ions serving as the active materials of the positive and negative electrodes, and (2) having excellent permeability of $H^+$ ion (charge carrier inside a battery), and can be suitably used for the membrane.

Effect of the Invention

The redox flow battery according to the present invention can generate a high electromotive force, and suppress generation of a precipitation.

BRIEF DESCRIPTION OF THE DRAWINGS

FIG. 1 (I) illustrates the operating principles of a battery system including a redox flow battery according to a first reference embodiment, and FIG. 1 (II) is a functional block diagram of the battery system further including control means.

FIG. 2 illustrates the operating principles of a battery system including a redox flow battery according to a second embodiment.

FIG. 3 illustrates the operating principles of a battery system including a redox flow battery according to a third embodiment.

FIG. 4 shows graphs illustrating relations between a cycle time (sec) of charge and discharge and a battery voltage (V) with different membranes, in a Ti/Mn-based redox flow battery manufactured in a second experimental example.

FIG. 5 is a graph showing relation between sulfuric acid concentration (M) and manganese ion (divalent) solubility (M).

FIG. 6 shows graphs illustrating relations between a cycle time (sec) of charge and discharge and a battery voltage (V) with different manganese ion concentrations, in a V/Mn-based redox flow battery manufactured in a fourth experimental example.

FIG. 7 shows graphs illustrating relations between a cycle time (sec) of charge and discharge and a battery voltage (V) with different sulfuric acid concentrations, in a V/Mn-based redox flow battery manufactured in a fifth experimental example.

FIG. 8 shows graphs illustrating relations between a cycle time (sec) of charge and discharge and a battery voltage (V) with different sulfuric acid concentrations, in a V/Mn-based redox flow battery manufactured in a sixth experimental example.

FIG. 9 shows graphs illustrating relations between a cycle time (sec) of charge and discharge and a battery voltage (V) with different amounts of electrolytes of electrodes or different current densities, in a Ti/Mn-based redox flow battery manufactured in a seventh experimental example.

MODES FOR CARRYING OUT THE INVENTION

Referring to FIGS. 1 to 3, battery systems including redox flow batteries according to first reference embodiment and second to third embodiments will be generally described below. FIGS. 1 (I) and 2 show illustrative ion types. In FIGS. 1 to 3, the same reference signs indicate components of the same names. In FIGS. 1 to 3, a solid line arrow indicates charge, and a broken line arrow indicates discharge. Further, FIGS. 1 to 3 illustrate metal ions in their representative forms, and forms other than the illustrated ones may be included.

Redox flow batteries 100 according to the first reference embodiment and the second to third embodiments have similar basic structures, which are first described with reference to FIGS. 1 (I), 2 and 3. Redox flow battery 100 is representatively connected to a power generation unit (e.g., a solar photovoltaic power generator, a wind power generator, or a common power plant) and to a power system or a consumer through an AC/DC converter, charged with the power generation unit as a power supply source, and discharged to provide power to the power system or the consumer. To be charged and discharged, the following battery system including redox flow battery 100 and a circulation mechanism (tanks, ducts, pumps) for circulating an electrolyte through battery 100 is constructed.

Redox flow battery 100 includes a positive electrode cell 102 having a positive electrode 104 therein, a negative electrode cell 103 having a negative electrode 105 therein, and a membrane 101 separating cells 102 and 103 from each other, through which ions permeate as appropriate. Positive electrode cell 102 is connected to a tank 106 for a positive electrode electrolyte through ducts 108, 110. Negative electrode cell 103 is connected to a tank 107 for a negative electrode electrolyte through ducts 109, 111. Ducts 108, 109 include pumps 112, 113 for circulating the electrolytes of the electrodes, respectively. In redox flow battery 100, the positive electrode electrolyte in tank 106 and the negative electrode electrolyte in tank 107 are supplied to positive electrode cell 102 (positive electrode 104) and negative electrode cell 103 (negative electrode 105) through circulation, respectively, through ducts 108 to 111 and pumps 112, 113, to charge and discharge the battery through valence change reaction of metal ions serving as active materials in the electrolytes of both electrodes.

Redox flow battery 100 representatively has a form referred to as a cell stack, which includes a plurality of cells 102, 103 stacked therein. Cells 102, 103 are representatively structured with a cell frame including a bipolar plate (not shown) having positive electrode 104 arranged on one surface and negative electrode 105 on the other surface, and a frame (not shown) having a liquid supply hole for supplying the electrolytes and a liquid drainage hole for draining the electrolytes, and formed on the periphery of the bipolar plate. By stacking a plurality of cell frames, the liquid supply holes and the liquid drainage holes form a fluid path for the electrolytes, which is connected to ducts 108 to 111 as appropriate. The cell stack is structured by successively and repeatedly stacking the cell frame, positive electrode 104, membrane 101, negative electrode 105, and the cell frame. A known structure may be used as appropriate as a basic structure of the redox flow battery system.

Particularly, in the redox flow battery according to the first reference embodiment, the positive electrode electrolyte contains a manganese ion, and the negative electrode electrolyte contains at least one type of metal ion selected from a titanium ion, a vanadium ion, a chromium ion, a zinc ion, and a tin ion (a titanium ion is shown as an example in FIG. 1 (I)). Redox flow battery 100 according to the first reference embodiment uses the manganese ion as the positive electrode active material and the metal ion mentioned above as the negative electrode active material, and is operated such that the positive electrode electrolyte has an SOC of not more than 90%. In this embodiment, it is preferable that the redox flow battery system further include control means for controlling an operating state such that the SOC is within the specific range. As will be described later, the SOC is determined from a charge time and a theoretical charge time. Thus, control means 200 may include, for example, input means 201 for previously inputting parameters (such as a charge current, a quantity of electricity of the active material) which are used for calculating the theoretical charge time as shown in FIG. 1 (II), charge time operation means 202 for calculating the theoretical charge time from the input parameters, storage means 203 for storing various input values, timer means 204 for measuring the charge time for battery 100, SOC operation means 205 for operating the SOC from the measured charge time and the theoretical charge time obtained by operation, determination means 206 for determining whether or not the SOC is within the specific range, and instruction means 207 for indicating continuation or termination of operation of battery 100 in order to adjust the charge time for battery 100 based on the results of the determination means. For such control means, a computer including a processor having the operation means and the like, and including direct input means 210 such as a keyboard may be suitably used. Display means 211 such as a monitor may also be included.

Particularly, in the redox flow battery according to the second embodiment, the positive electrode electrolyte contains both of a manganese ion and a titanium ion, and the negative electrode electrolyte contains at least one type of metal ion selected from a titanium ion, a vanadium ion, a chromium ion, a zinc ion, and a tin ion (a titanium ion is shown as an example in FIG. 2). Redox flow battery 100 according to the second embodiment uses the manganese ion as the positive electrode active material and the metal ion mentioned above as the negative electrode active material.

Particularly, in the redox flow battery according to the third embodiment, both of the positive electrode electrolyte and the negative electrode electrolyte contain both of a manganese ion and a titanium ion, the manganese ion in the positive electrode electrolyte serves as the positive electrode active material, and the titanium ion in the negative electrode electrolyte serves as the negative electrode active material.

The electrolytes and operating conditions of the redox flow battery according to the first reference embodiment will be described below with reference to experimental examples.

FIRST EXPERIMENT EXAMPLE

The redox flow battery system shown in FIG. 1 was structured, charged and discharged with an electrolyte containing a manganese ion for an active material as the positive electrode electrolyte, and relation between a state of charge (SOC) of the positive electrode electrolyte and a precipitation phenomenon was examined.

As the positive electrode electrolyte, an electrolyte having a manganese ion (divalent) concentration of 1M was prepared by dissolving manganese sulfate (divalent) in a sulfuric acid aqueous solution ($H_2SO_4$aq) having a sulfuric acid concentration of 4M. As the negative electrode electrolyte, an electrolyte having a vanadium ion (trivalent) concentration of 1.7M was prepared by dissolving vanadium sulfate (trivalent) in a sulfuric acid aqueous solution ($H_2SO_4$aq) having a sulfuric acid concentration of 1.75M. A carbon felt was used for each electrode, and an anion exchange membrane was used for the membrane.

In this experiment, a small cell in which an electrode had an area of 9 $cm^2$ was made, 6 ml (6 cc) of the electrolyte was prepared for each electrode, and charge and discharge was performed with these electrolytes. Particularly, in this experiment, a battery voltage when switching takes place between charge and discharge, i.e., a switching voltage was set as a maximum charge voltage, and the SOC of the positive electrode electrolyte upon completion of charge was varied by changing the switching voltage as shown in Table 1. Charge and discharge was performed with a constant current having a current density of 70 mA/cm$^2$, and charge was switched to discharge when the switching voltage shown in Table 1 was reached. The SOC was calculated as indicated below, on the assumption that a quantity of conducted electricity (integrated value: A×h (time)) had entirely been used for charge (one-electron reaction: $Mn^{2+} \rightarrow Mn^{3+}+e^-$). The SOC was measured using an initial charge time. In the first and all subsequent experimental examples, charge efficiency was almost 100%, and an error was considered to be small even on the assumption that the quantity of conducted electricity had entirely been used for charge.

Quantity of charged electricity (A·second) = (I)
    charge time (t) × charge current
Quantity of electricity of active material =
    mole number × Faraday constant =
    volume × concentration × 96,485(A·second/mol)
Theoretical charge time = quantity of electricity
    of active material/charge current State of charge = quantity of charged (I)
    electricity/theoretical quantity of charged electricity =
    (charge time × current)/(theoretical charge time × current) =
    charge time × theoretical charge time A charge and discharge cycle was repeated three times under the above conditions, and then presence of a precipitation was examined. The results are shown in Table 1.

TABLE 1

| Switching voltage (V) | State of charge (%) | Presence of Precipitation |
|---|---|---|
| 1.70 | 14 | No |
| 1.80 | 47 | No |
| 1.82 | 70 | No |
| 1.84 | 90 | No |
| 1.85 | 104 | Yes |
| 1.9 | 139 | Yes |
| 2.0 | 148 | Yes |
| 2.1 | 159 | Yes |

As shown in Table 1, when the SOC was more than 90%, a precipitation was generated even after three charge and discharge cycles, and it was difficult to obtain functionality of a battery after these cycles due to the precipitation. The precipitation was examined and found to be $MnO_2$.

In contrast, when the SOC was not more than 90%, oxidation-reduction reaction of divalent manganese ions and trivalent manganese ions occurred reversibly, and functionality of a battery could be obtained to a sufficient degree. When the SOC was near 90%, although a small amount of precipitation was observed, the battery could be used without any difficulty, and when the SOC was not more than 70%, a precipitation was not substantially observed. Further, by using the electrodes made of carbon felt, generated oxygen gas was substantially negligible.

It is thus shown that even in such redox flow battery using the positive electrode electrolyte containing a manganese ion as the positive electrode active material, generation of a precipitation of $MnO_2$ can be effectively suppressed, and the battery can be charged and discharged well by being operated such that the positive electrode electrolyte has an SOC of not more than 90%. In particular, the vanadium-manganese-based redox flow battery shown in this experimental example can have a high electromotive force of about 1.8V.

When chromium sulfate (trivalent), zinc sulfate (divalent) or tin sulfate (tetravalent) are used instead of the vanadium sulfate (trivalent), generation of a precipitation can be suppressed by operating the battery such that the positive electrode electrolyte has an SOC of not more than 90% upon completion of charge.

SECOND EXPERIMENTAL EXAMPLE

A redox flow battery system was structured, charged and discharged in the same manner as the first experimental example, and battery properties (current efficiency, voltage efficiency, energy efficiency) were examined.

In this experiment, the negative electrode active material contained a metal ion different from that in the first experimental example. Specifically, as the negative electrode electrolyte, an electrolyte having a titanium ion (tetravalent) concentration of 1M was prepared by dissolving titanium sulfate (tetravalent) in a sulfuric acid aqueous solution ($H_2SO_4$aq) having a sulfuric acid concentration of 3.6M. The positive electrode electrolyte used was the same as that in the first experimental example (sulfuric acid concentration: 4M, manganese sulfate (divalent) was used, manganese ion (divalent) concentration: 1M). A carbon felt was used for each electrode, and an anion exchange membrane or a cation exchange membrane was used for the membrane.

As in the first experimental example, a small cell in which an electrode had an area of 9 cm$^2$ was made, 6 ml (6 cc) of the electrolyte was prepared for each electrode, and charge and discharge was performed with these electrolytes and a constant current having a current density of 70 mA/cm$^2$, as in the first experimental example. In this experiment, charge was terminated and switched to discharge when the switching voltage reached 1.60V as shown in FIG. 4, such that the positive electrode electrolyte had an SOC of not more than 90% upon completion of charge.

As a result, although a small amount of precipitation ($MnO_2$) was observed in both cases where the anion exchange membrane and the cation exchange membrane were used, it was confirmed that oxidation-reduction reaction of divalent manganese ions and trivalent manganese ions occurred reversibly, and functionality of a battery could be obtained without any difficulty as in the first experimental example, as shown in FIG. 4.

Further, for both cases where the anion exchange membrane was used and the cation exchange membrane was used, current efficiency, voltage efficiency, and energy efficiency of charge and discharge described above were examined. Current efficiency is expressed as a quantity of discharged electricity (C)/a quantity of charged electricity (C), voltage efficiency is expressed as a discharge voltage (V)/a charge voltage (V), and energy efficiency is expressed as current efficiency×voltage efficiency. Each efficiency was calculated by measuring an integrated value of a quantity of conducted electricity (A×h (time)), an average voltage during charge and an average voltage during discharge, and using these measured values. Further, the SOC was determined in the same manner as the first experimental example.

As a result, when the anion exchange membrane was used, the current efficiency was 97.8%, the voltage efficiency was 88.6%, the energy efficiency was 86.7%, a discharged capacity was 12.9 min (ratio to theoretical discharged capacity: 84%), and the SOC was 86% (13.2 min), and when the cation exchange membrane was used, the current efficiency was 98.2%, the voltage efficiency was 85.1%, the energy efficiency was 83.5%, a discharged capacity was 12.9 min (ratio to theoretical discharged capacity: 84%), and the SOC was 90% (14 min), and it was confirmed that excellent battery properties were obtained in both cases.

THIRD EXPERIMENTAL EXAMPLE

Solubility of a manganese ion (divalent) in sulfuric acid ($H_2SO_4$) was examined. The results are shown in FIG. 5. As shown in FIG. 5, it can be seen that the solubility of a manganese ion (divalent) decreases as sulfuric acid concentration increases, and the solubility is 0.3M when the sulfuric acid concentration is 5M. Conversely, it can be seen that high solubility of 4M is obtained in an area of low sulfuric acid concentration. The results show that, in order to increase manganese ion concentration in an electrolyte, particularly in order to obtain a practically desired concentration of not less than 0.3M, when a sulfuric acid aqueous solution is used as a solvent for the electrolyte, it is preferable to have a low sulfuric acid concentration of less than 5M.

FOURTH EXPERIMENTAL EXAMPLE

A vanadium-manganese-based redox flow battery system was structured, charged and discharged in the same manner as the first experimental example, and a precipitation state was examined.

In this experiment, as the positive electrode electrolyte, the following three types of positive electrode electrolytes (I) to (III) having different sulfuric acid concentrations and manganese ion (divalent) concentrations were prepared by dissolving manganese sulfate (divalent) in a sulfuric acid aqueous solution ($H_2SO_4$aq). As the negative electrode electrolyte, an electrolyte having a vanadium ion (trivalent) concentration of 1.7M was prepared by dissolving vanadium sulfate (trivalent) in a sulfuric acid aqueous solution ($H_2SO_4$aq) having a sulfuric acid concentration of 1.75M. The conditions other than the electrolytes were the same as those for the redox flow battery according to the first experimental example (membrane: anion exchange membrane, electrode: carbon felt, area of electrode: 9 $cm^2$, amount of each electrolyte: 6 ml).

(I) Sulfuric acid concentration:manganese ion (divalent) concentration=1M :4M (II) Sulfuric acid concentration:manganese ion (divalent) concentration=2M:3M (III) Sulfuric acid concentration:manganese ion (divalent) concentration=4M:1.5M Charge and discharge was performed with a constant current having a current density of 70 mA/$cm^2$, and repeatedly performed such that charge was terminated and switched to discharge when a battery voltage (switching voltage) reached 2.10V, as shown in FIG. 6.

As a result, when the positive electrode electrolytes (I) and (II) were used, the SOC was not more than 90%, and although a small amount of precipitation ($MnO_2$) was observed, charge and discharge could be performed well without any difficulty, as will be described later. In contrast, when the positive electrode electrolyte (III) was used, the SOC was more than 90% (122%), and a large amount of precipitated $MnO_2$ was observed after a few cycles. As such, it can be seen that a different liquid composition results in a different SOC even with the same switching voltage. Thus, when the battery is operated over a long period of time with the positive electrode electrolyte having an SOC of more than 90%, measures to suppress precipitation of $MnO_2$ need to be taken.

Battery properties of the redox flow battery used in this experiment were examined in the same manner as the second experimental example. The redox flow battery using the positive electrode electrolyte (I) had a current efficiency of 84.2%, a voltage efficiency of 81.4%, an energy efficiency of 68.6%, a discharged capacity of 18.2 min (ratio to theoretical discharged capacity: 30%), and an SOC of 44% (26.8 min), the redox flow battery using the positive electrode electrolyte (II) had a current efficiency of 94.2%, a voltage efficiency of 87.6%, an energy efficiency of 82.6%, a discharged capacity of 25.7 min (ratio to theoretical discharged capacity: 56%), and an SOC of 60% (27.4 min), and the redox flow battery using the positive electrode electrolyte (III) had, when measured in an early stage of operation, a current efficiency of 97.1%, a voltage efficiency of 89.4%, an energy efficiency of 86.7%, a discharged capacity of 25.6 min (ratio to theoretical discharged capacity: 111%), and an SOC of 122% (28.1 min). It can be seen that excellent battery properties are attained when the positive electrode electrolytes (I), (II) are used. In addition, it can be said from these results that the battery properties tend to be better with increase in sulfuric acid concentration, and with decrease in manganese ion (divalent) concentration when the concentration is not less than 0.3M and not more than 5M.

FIFTH EXPERIMENTAL EXAMPLE

A vanadium-manganese-based redox flow battery system was structured, charged and discharged in the same manner as the fourth experimental example, and a precipitation state was examined.

In this experiment, three types of positive electrode electrolytes having a manganese ion (divalent) concentration fixed to 1M and different sulfuric acid concentrations 2M, 3M, 4M (referred to as electrolytes (I), (II), (III), respectively) were prepared, and the other conditions were the same as those in the fourth experimental example (sulfuric acid concentration in negative electrode electrolyte: 1.75M, vanadium ion (trivalent) concentration in negative electrode electrolyte: 1.7M, membrane: anion exchange membrane, electrode: carbon felt, area of electrode: 9 $cm^2$, amount of each electrolyte: 6 ml). Charge and discharge was repeatedly performed under the same conditions as those in the fourth experimental example (switching voltage: 2.1V, current density: 70 mA/$cm^2$). FIG. 7 show relations between a cycle time of charge and discharge and the battery voltage when the electrolytes (I) to (III) were used.

As a result, the redox flow battery using the electrolytes (I) and (II) that could be operated such that the SOC was not more than 90% could be charged and discharged well without any difficulty although a small amount of precipitation ($MnO_2$) was observed, as will be described later. In contrast, the redox flow battery using the electrolyte (III) having an SOC of more than 90% could be operated for about three cycles, but a large amount of precipitation was observed after a few cycles of operation, resulting in difficulty in continuing the operation.

Battery properties of the redox flow battery used in this experiment were examined in the same manner as the second experimental example. The redox flow battery using the electrolyte (I) had a current efficiency of 86.1%, a voltage efficiency of 84.4%, an energy efficiency of 72.6%, a discharged capacity of 7.3 min (ratio to theoretical discharged capacity: 48%), and an SOC of 63% (9.7 min), and the redox flow battery using the electrolyte (II) had a current efficiency of 89.1%, a voltage efficiency of 87.3%, an energy efficiency of 77.7%, a discharged capacity of 11.8 min (ratio to theoretical discharged capacity: 77%), and an SOC of 90% (13.7 min), which indicated excellent battery properties. In contrast, the redox flow battery using the electrolyte (III) had, when measured in an early stage of operation, a current efficiency of 96.9%, a voltage efficiency of 88.5%, an energy efficiency of 85.7%, a discharged capacity of 19.3 min (ratio to theoretical discharged capacity: 126%), and an SOC of 159% (24.3 min).

Here, a theoretical discharged capacity (discharge time) of one-electron reaction in an electrolyte having a volume of 6 ml and a manganese ion (divalent) concentration of 1M is 15.3 minutes. In contrast, when the electrolyte (III) having the sulfuric acid concentration of 4M was used in this experiment, a discharged capacity of 19.3 minutes was surprisingly obtained. The reason for this increase in discharged capacity may be because $MnO_2$ (tetravalent) generated through disproportionation reaction was reduced to a manganese ion (divalent) through two-electron reaction. It is thus considered that the phenomenon resulting from two-electron reaction (tetravalent→divalent) can be utilized to increase energy density, thereby obtaining a higher battery capacity.

The redox flow battery according to the second embodiment will be described below with reference to an experimental example.

SIXTH EXPERIMENTAL EXAMPLE

The redox flow battery system shown in FIG. 2 according to the second embodiment was structured, charged and discharged with an electrolyte containing both a manganese ion and a titanium ion as the positive electrode electrolyte, and a precipitation state and battery properties were examined.

In this experiment, as the positive electrode electrolyte, two types of sulfuric acid aqueous solutions ($H_2SO_4$aq) having different sulfuric acid concentrations were prepared, and manganese sulfate (divalent) and titanium sulfate (tetravalent) were dissolved in each of the sulfuric acid aqueous solutions, to prepare electrolytes having a manganese ion (divalent) concentration of 1M and a titanium ion (tetravalent) concentration of 1M. The positive electrode electrolyte having a sulfuric acid concentration of 1M will be referred to as an electrolyte (I), and the positive electrode electrolyte having a sulfuric acid concentration of 2.5M will be referred to as an electrolyte (II). As the negative electrode electrolyte, an electrolyte having a vanadium ion (trivalent) concentration of 1.7M was prepared by dissolving vanadium sulfate (trivalent) in a sulfuric acid aqueous solution ($H_2SO_4$aq) having a sulfuric acid concentration of 1.75M. A carbon felt was used for each electrode, and an anion exchange membrane was used for the membrane.

In this experiment, a small cell in which an electrode had an area of 9 $cm^2$ was made, 6 ml (6 cc) of the electrolyte was prepared for each electrode, and charge and discharge was performed with these electrolytes. Particularly, in this experiment, a battery voltage when switching takes place between charge and discharge, i.e., a switching voltage was set as a maximum charge voltage, and the switching voltage was set to 2.1V in both cases where the electrolytes (I) and (II) were used. Charge and discharge was performed with a constant current having a current density of 70 $mA/cm^2$, and charge was switched to discharge when the switching voltage was reached.

For the redox flow battery using the electrolytes (I), (II), the SOCs in an early stage of charge time were measured. The SOC was calculated in the same manner as the first experimental experiment, on the assumption that a quantity of conducted electricity (integrated value: A×h (time)) had entirely been used for charge (one-electron reaction: $Mn^{2+}→Mn^{3+}+e^-$). In this experiment, charge efficiency was almost 100%, and an error was considered to be small even on the assumption that the quantity of conducted electricity had entirely been used for charge.

FIGS. 8 (I) and 8 (II) show relations between the cycle time of charge and discharge and the battery voltage when the electrolytes (I) and (II) were used, respectively. The redox flow battery using the electrolyte (I) had an SOC of 118% (18 min), and the redox flow battery using the electrolyte (II) had an SOC of 146%. It was confirmed that, even if charge was performed until after the positive electrode electrolyte had an SOC of more than 100%, and further more than 130% upon completion of charge in this manner, a precipitation ($MnO_2$) was not substantially observed at all, and oxidation-reduction reaction of divalent manganese ions and trivalent manganese ions occurred reversibly, allowing functionality of a battery without any difficulty. It is assumed from these results that by containing a titanium ion in the positive electrode electrolyte, $Mn^{3+}$ is stabilized, and any generated $MnO_2$ is not precipitated but exists stably in the electrolyte, acting on charge and discharge reaction.

Further, for both cases where the electrolytes (I) and (II) were used, current efficiency, voltage efficiency, and energy efficiency of charge and discharge described above were examined. The current efficiency, voltage efficiency, and energy efficiency were calculated in the same manner as the second experimental example.

As a result, when the electrolyte (I) was used, the current efficiency was 98.4%, the voltage efficiency was 85.6%, and the energy efficiency was 84.2%, and when the electrolyte (II) was used, the current efficiency was 98.3%, the voltage efficiency was 87.9%, and the energy efficiency was 86.4%, and it was confirmed that excellent battery properties were obtained in both cases.

Here, a theoretical discharged capacity (discharge time) of one-electron reaction in an electrolyte having a volume of 6 ml and a manganese ion (divalent) concentration of 1M is 15.3 minutes, as described above. In contrast, when the electrolytes (I) and (II) were used, the discharged capacities were 16.8 min, 19.7 min, respectively, which correspond to 110%, 129% with respect to the theoretical discharged capacity, respectively. The reason for this increase in discharged capacity may be because $MnO_2$ (tetravalent) generated during charge was reduced to a manganese ion (divalent) through two-electron reaction. It is thus considered that the phenomenon resulting from two-electron reaction (tetravalent→divalent) can be utilized as described above to increase energy density, thereby obtaining a higher battery capacity.

It is thus shown that even in such redox flow battery using the positive electrode electrolyte containing a manganese ion as the positive electrode active material, generation of a precipitation of $MnO_2$ can be effectively suppressed, and the battery can be charged and discharged well by containing a titanium ion. In particular, the vanadium-manganese-based redox flow battery shown in this experimental example can have a high electromotive force of about 1.8V. Further, by using the electrodes made of carbon felt, generated oxygen gas was substantially negligible.

When titanium sulfate (tetravalent), chromium sulfate (trivalent), zinc sulfate (divalent) or tin sulfate (tetravalent)

are used instead of the vanadium sulfate (trivalent) above, generation of a precipitation can be suppressed by containing both a manganese ion and a titanium ion (tetravalent) in the positive electrode electrolyte.

The redox flow battery according to the third embodiment will be described below with reference to an experimental example.

SEVENTH EXPERIMENTAL EXAMPLE

The redox flow battery system shown in FIG. 3 according to the third embodiment was structured, charged and discharged with an electrolyte containing both a manganese ion and a titanium ion as both of the positive electrode electrolyte and the negative electrode electrolyte, and a precipitation state and battery properties were examined.

In this experiment, for both of the positive electrode electrolyte and the negative electrode electrolyte to contain the same types of metal ions, an electrolyte having a manganese ion (divalent) concentration of 1.2M and a titanium ion (tetravalent) concentration of 1.2M was prepared by dissolving manganese sulfate (divalent) and titanium sulfate (tetravalent) in a sulfuric acid aqueous solution ($H_2SO_4$aq) having a sulfuric acid concentration of 2M. A carbon felt was used for each electrode, and an anion exchange membrane was used for the membrane.

In this experiment, a small cell in which an electrode had an area of 9 cm$^2$ was made, 6 ml (6 cc) of the electrolyte was prepared for each electrode in Embodiment (I), 6 ml (6 cc) of the positive electrode electrolyte and 9 ml (9 cc) of the negative electrode electrolyte were prepared in Embodiments (II) and (III), and charge and discharge was performed with these electrolytes. Particularly, in this experiment, a battery voltage when switching takes place between charge and discharge, i.e., a switching voltage was set as a maximum charge voltage, and the switching voltage was set to 1.7V in Embodiments (I) to (III). Charge and discharge was performed with a constant current having a current density of 50 mA/cm$^2$ in Embodiments (I) and (III) and with a constant current having a current density of 70 mA/cm$^2$ in Embodiment (II), and charge was switched to discharge when the switching voltage was reached.

For the redox flow battery in Embodiments (I), (II) and (III), the SOCs in an early stage of charge time were measured. The SOC was calculated in the same manner as the first experimental experiment, on the assumption that a quantity of conducted electricity (integrated value: A×h (time)) had entirely been used for charge (one-electron reaction: $Mn^{2+} \rightarrow Mn^{3+}+e^-$). In this experiment, charge efficiency was almost 100%, and an error was considered to be small even on the assumption that the quantity of conducted electricity had entirely been used for charge.

FIGS. 9 (I), 9 (II) and 9 (III) show relations between the cycle time of charge and discharge and the battery voltage in Embodiments (I), (II) and (III), respectively. The SOC in Embodiment (I) was 101% (26 min), and by making the amount of negative electrode electrolyte higher than the amount of positive electrode electrolyte to increase the SOC, the SOC in Embodiment (II) was 110% (20.2 min). Further, by decreasing the current density from 70 mA/cm$^2$ to 50 mA/cm$^2$ to increase the SOC with the same amounts of electrolytes of both electrodes as in Embodiment (II), the SOC in Embodiment (III) was 139% (35.6 min). It was confirmed that, even if charge was performed until after the positive electrode electrolyte had an SOC of more than 100%, and further more than 130% upon completion of charge in this manner, a precipitation ($MnO_2$) was not substantially observed at all, and oxidation-reduction reaction of divalent manganese ions and trivalent manganese ions occurred reversibly, allowing functionality of a battery without any difficulty. It is assumed from these results that by containing a titanium ion in the positive electrode electrolyte, $Mn^{3+}$ is stabilized, and any generated $MnO_2$ is not precipitated but exists stably in the electrolyte, acting on charge and discharge reaction.

Further, for Embodiments (I), (II) and (III), current efficiency, voltage efficiency, and energy efficiency of charge and discharge described above were examined. The current efficiency, voltage efficiency, and energy efficiency were calculated in the same manner as the second experimental example.

As a result, the current efficiency was 98.8%, the voltage efficiency was 88.9%, and the energy efficiency was 87.9% in Embodiment (I), the current efficiency was 99.8%, the voltage efficiency was 81.6%, and the energy efficiency was 81.4% in Embodiment (II), and the current efficiency was 99.6%, the voltage efficiency was 85.3%, and the energy efficiency was 85.0% in Embodiment (III), and it was confirmed that excellent battery properties were obtained in all cases.

Here, a theoretical discharged capacity (discharge time) of one-electron reaction ($MN^{3+}+e=Mn^{2+}$) in an electrolyte having a volume of 6 ml and a manganese ion (divalent) concentration of 1.2M is 25.7 minutes (50 mA/cm$^2$). In contrast, the discharged capacities in Embodiments (I) to (III) were 24.2 min (50 mA/cm$^2$), 20.1 min (70 mA/cm$^2$), and 33.5 min (50 mA/cm$^2$), respectively. The reason for this increase in discharged capacity may be because $MnO_2$ (tetravalent) generated during charge was reduced to a manganese ion (divalent) through two-electron reaction. It is thus considered that the phenomenon resulting from two-electron reaction (tetravalent→divalent) can be utilized as described above to increase energy density, thereby obtaining a higher battery capacity.

It is thus shown that even in such redox flow battery using the positive electrode electrolyte containing a manganese ion as the positive electrode active material, generation of a precipitation of $MnO_2$ can be effectively suppressed, and the battery can be charged and discharged well by containing a titanium ion. In particular, the titanium-manganese-based redox flow battery shown in this experimental example can have a high electromotive force of about 1.4V. Moreover, since the types of metal ions existing in the electrolytes of the positive and negative electrodes are equal to each other in this redox flow battery, excellent effects can be attained. Namely, (1) battery capacity decrease due to movement of the metal ions to a counter electrode does not substantially occur, (2) even if liquid transfer occurs to cause a difference in amounts of electrolytes of both electrodes, the difference can be readily corrected, and (3) the electrolytes can be readily produced. Further, by using the electrodes made of carbon felt, generated oxygen gas was substantially negligible.

The embodiments described above can be modified as appropriate without departing from the substance of the present invention, and are not limited to the description provided above. For example, the manganese ion concentration and the titanium ion concentration in the positive electrode electrolyte, the acid concentration in the solvent of the positive electrode electrolyte, the type and concentration of the metal ion for the negative electrode active material, the type and concentration of the solvent in the electrolyte of each electrode, the material of the electrodes, the material of the membrane and the like can be modified as appropriate.

INDUSTRIAL APPLICABILITY

The redox flow battery according to the present invention can be suitably used as a large-capacity storage battery for stabilizing variations in power generation output, storing surplus generated power, and load leveling for power generation of new energy such as solar photovoltaic power generation and wind power generation. The redox flow battery according to the present invention can also be suitably used as a large-capacity storage battery attached to a common power plant for voltage sag and power failure prevention and for load leveling.

DESCRIPTION OF THE REFERENCE SIGNS 100 redox flow battery; 101 membrane; 102 positive electrode cell; 103 negative electrode cell; 104 positive electrode; 105 negative electrode; 106 tank for positive electrode electrolyte; 107 tank for negative electrode electrolyte; 108, 109, 110, 111 duct; 112, 113 pump; 200 control means; 201 input means; 202 charge time operation means; 203 storage means; 204 timer means; 205 SOC operation means; 206 determination means; 207 instruction means; 210 direct input means; 211 display means.

The invention claimed is:
1. A redox flow battery in which a positive electrode electrolyte and a negative electrode electrolyte are supplied to a battery cell including a positive electrode, a negative electrode, and a membrane interposed between the electrodes, to charge and discharge the battery,
   said positive electrode electrolyte containing a manganese ion,
   said negative electrode electrolyte containing at least one type of metal ion selected from a titanium ion, a vanadium ion, a chromium ion, a zinc ion, and a tin ion, and
   said positive electrode electrolyte containing a titanium ion as a precipitation suppression means for suppressing precipitation of $MnO_2$.
2. The redox flow battery according to claim 1, wherein both of said positive electrode electrolyte and said negative electrode electrolyte contain both of a manganese ion and a titanium ion.
3. The redox flow battery according to claim 1, wherein both of said manganese ion and said titanium ion have a concentration of not less than 0.3 M and not more than 5 M.
4. The redox flow battery according to claim 1, wherein both of said manganese ion and each metal ion in said negative electrode electrolyte have a concentration of not less than 0.3 M and not more than 5 M.
5. The redox flow battery according to claim 1, wherein both of said electrolytes contain sulfate anion, and both of said electrolytes have a sulfuric acid concentration of less than 5 M.
6. The redox flow battery according to claim 1, wherein said positive electrode electrolyte contains at least one type of manganese ion selected from a divalent manganese ion and a trivalent manganese ion, and a tetravalent titanium ion, and
said negative electrode electrolyte satisfies any one of:
(1) containing at least one type of titanium ion selected from a trivalent titanium ion and a tetravalent titanium ion;
(2) containing at least one type of vanadium ion selected from a divalent vanadium ion and a trivalent vanadium ion;
(3) containing at least one type of chromium ion selected from a divalent chromium ion and a trivalent chromium ion;
(4) containing a divalent zinc ion; and
(5) containing at least one type of tin ion selected from a divalent tin ion and a tetravalent tin ion.
7. The redox flow battery according to claim 1, wherein
said positive electrode electrolyte contains at least one type of manganese ion selected from a divalent manganese ion and a trivalent manganese ion, tetravalent manganese, and a tetravalent titanium ion, and
said negative electrode electrolyte satisfies any one of:
(I) containing at least one type of titanium ion selected from a divalent titanium ion, a trivalent titanium ion, and a tetravalent titanium ion;
(II) containing at least one type of vanadium ion selected from a divalent vanadium ion and a trivalent vanadium ion;
(III) containing at least one type of chromium ion selected from a divalent chromium ion and a trivalent chromium ion;
(IV) containing a divalent zinc ion; and
(V) containing at least one type of tin ion selected from a divalent tin ion and a tetravalent tin ion.
8. The redox flow battery according to claim 1, wherein
said positive electrode electrolyte further contains a trivalent chromium ion, and
said negative electrode electrolyte contains a chromium ion and a divalent manganese ion.
9. The redox flow battery according to claim 2, wherein
said positive electrode electrolyte contains at least one type of manganese ion selected from a divalent manganese ion and a trivalent manganese ion, and a tetravalent titanium ion, and
said negative electrode electrolyte contains at least one type of titanium ion selected from a trivalent titanium ion and a tetravalent titanium ion, and a divalent manganese ion.
10. The redox flow battery according to claim 2, wherein
said positive electrode electrolyte contains at least one type of manganese ion selected from a divalent manganese ion and a trivalent manganese ion, tetravalent manganese, and a tetravalent titanium ion, and
said negative electrode electrolyte contains at least one type of titanium ion selected from a divalent titanium ion, a trivalent titanium ion, and a tetravalent titanium ion, and a divalent manganese ion.
11. The redox flow battery according claim 1, wherein
said positive electrode and said negative electrode are made of at least one type of material selected from
a composite material including at least one type of metal selected from Ru, Ti, Ir, Mn, Pd, Au, and Pt, and an oxide of at least one type of metal selected from Ru, Ti, Ir, Mn, Pd, Au, and Pt,
a carbon composite including said composite material,
a dimensionally stable electrode (DSE) including said composite material,
a conductive polymer,
graphite,
glassy carbon,
conductive diamond, conductive diamond-like carbon (DLC),
a nonwoven fabric made of carbon fiber, and
a woven fabric made of carbon fiber, and
said membrane is at least one type of membrane selected from a porous membrane, a swellable membrane, a cation exchange membrane, and an anion exchange membrane.

12. The redox flow battery according to claim 1, wherein a solvent for each of said electrode electrolytes is an aqueous solution of at least one species selected from $H_2SO_4$, $K_2SO_4$, $Na_2SO_4$, $H_3PO_4$, $K_2PO_4$, $Na_3PO_4$, $K_3PO_4$, $H_4P_2O_7$, $HNO_3$, $KNO_3$, and $NaNO_3$.

* * * * *